United States Patent  
Hofman

(10) Patent No.: US 7,440,138 B2  
(45) Date of Patent: Oct. 21, 2008

(54) CONVERSION OF COLOR IMAGES TO GRAY VALUE IMAGES

(75) Inventor: Paul Michiel Hofman, Nijmegen (NL)

(73) Assignee: Océ-Technologies B.V., Ma Venlo (NL)

( * ) Notice: Subject to any disclaimer, the term of this patent is extended or adjusted under 35 U.S.C. 154(b) by 937 days.

(21) Appl. No.: 10/226,168

(22) Filed: Aug. 23, 2002

(65) Prior Publication Data

US 2003/0058475 A1  Mar. 27, 2003

(30) Foreign Application Priority Data

Aug. 23, 2001 (NL) .................................. 1018808

(51) Int. Cl.  
H04N 1/40 (2006.01)

(52) U.S. Cl. .................. 358/3.01; 358/1.9; 358/504; 358/500; 358/501; 358/518; 382/225; 382/162

(58) Field of Classification Search ............... 358/3.01, 358/1.9, 504, 500, 501, 518; 382/225, 162  
See application file for complete search history.

(56) References Cited

U.S. PATENT DOCUMENTS

| 4,369,461 A | | 1/1983 | Tamura | |
|---|---|---|---|---|
| 5,428,465 A | * | 6/1995 | Kanamori et al. | 358/518 |
| 5,557,430 A | * | 9/1996 | Isemura et al. | 358/501 |
| 5,729,360 A | * | 3/1998 | Kita et al. | 358/500 |
| 5,751,450 A | * | 5/1998 | Robinson | 358/504 |
| 5,898,819 A | | 4/1999 | Austin et al. | |
| 6,128,407 A | * | 10/2000 | Inoue et al. | 382/167 |
| 6,473,521 B1 | * | 10/2002 | Hino | 382/164 |
| 6,822,758 B1 | * | 11/2004 | Morino | 358/1.9 |
| 6,829,061 B1 | * | 12/2004 | Jacob et al. | 358/1.9 |
| 2004/0212815 A1 | * | 10/2004 | Heeman et al. | 358/1.9 |

FOREIGN PATENT DOCUMENTS

| DE | 195 13 030 C1 | | 7/1996 |
|---|---|---|---|
| EP | 0 500 327 A2 | | 8/1992 |
| EP | 500327 A2 | * | 8/1992 |
| EP | 0 930 775 A2 | | 7/1999 |

OTHER PUBLICATIONS

Tao et al. "Color image edge detection using cluster analysis", Proceedings of the International Conference on Image Processing, Oct. 26-29, 1997, vol. 1, p. 834-836.*

* cited by examiner

Primary Examiner—Twyler L. Haskins  
Assistant Examiner—Jacky X Zheng  
(74) Attorney, Agent, or Firm—Birch, Stewart, Kolasch & Birch, LLP

(57) ABSTRACT

A method of converting a digital color image to a digital gray value image and in so doing distinguishably reproducing colors present in the color image is provided. The digital color image is built up of pixels each having a color value, and the digital gray value image is built up of pixels each having a gray value. The color values of the pixels are converted to gray values by the use of a dynamically adapted conversion function which is optimized on the basis of a comparison of color differences in the digital color image and gray value differences corresponding to the color differences in the digital gray value image. In this way, the colors which in conventional conversion methods are imaged on identical or substantially identical gray values can effectively be distinguishably reproduced.

15 Claims, 3 Drawing Sheets

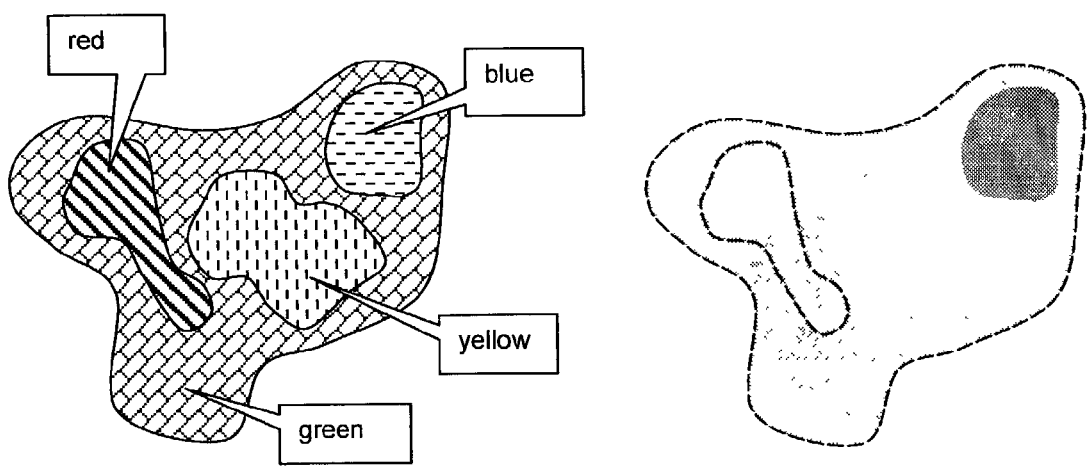
Fig. 1 A
Fig. 1 B
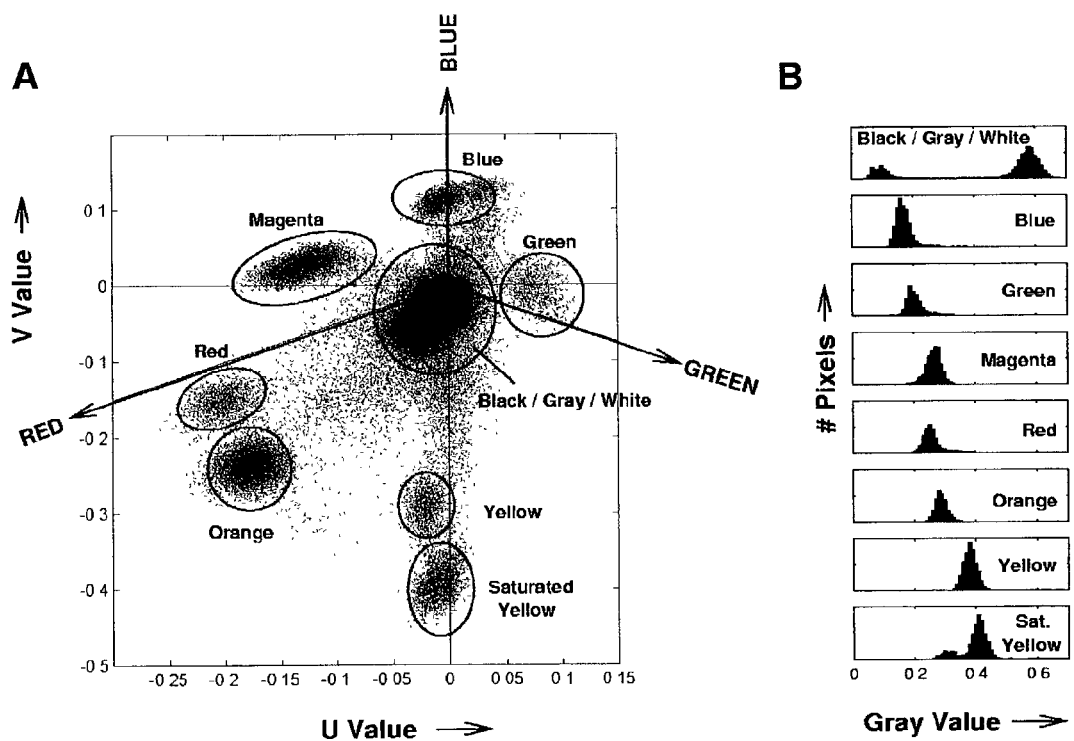
Fig. 3A
Fig. 3B

CONVERSION OF COLOR IMAGES TO GRAY VALUE IMAGES

The present application claims the benefit of Dutch Patent Application No. 1018808 filed Aug. 23, 2001, under 35 U.S.C § 119, which is herein fully incorporated by reference.

BACKGROUND OF THE INVENTION

1. Field of the Invention

The invention relates to a method of converting a digital color image to a gray value image, and more particularly, to a method of this kind suitable for distinguishably reproducing colors present in the color image.

2. Discussion of Related Art

A color image is very frequently converted to a gray value image in practice. This is done, for example, when a color photograph is copied by a conventional copier in black and white, or when a color image is printed in black and white by means of a printer.

In modern copying machines, the image on the photograph is converted by a scanner or other image sensing device to a digital image. In many cases the scanner involved converts the image to a digital color image. An image is converted into pixels with a color value for each pixel. It is conventional to express the color values in this case in R, G, B values. To make a gray value print, the copier will convert the R, G and B values to a gray value. For this purpose, the R, G and B values are often averaged, possibly with weighting. This is described, for example, in European Patent Application Publication No. EP-A-0-500327. Preferably, use is then made of the luminance of the color signal. These color-to-gray value conversions based on luminance, and conversions in which (a weighted) average of the color values such as R, G, B is calculated, are hereinafter referred to as "naïve" conversions. A conversion of this kind disregards the context or the environment of a pixel for conversion.

In the conversion of color values to gray values, three dimensions are projected on one dimension. As a result, certainly in the case of the above-described averaging of RGB values, very different colors can be projected on the same or substantially the same gray value. As a result, objects of different color may no longer be distinguishable in the gray value image. Accordingly there is a need for a conversion method which makes color differences which are present in the color image, distinguishable in the gray value image as well.

This requirement is described in U.S. Pat. No. 4,369,461, and the solution proposed therein is to replace colors in the color image by black and white patterns, for example hatching, which can be satisfactorily distinguished from one another.

The above document EP-A-500327 offers a similar solution, in which the replacing patterns are also programmable for the user.

It will be clear that although the original colors are distinguishable in an image converted in such a manner, the quality of the image suffers serious impairment. In addition, the distribution of the color range over the different code patterns is pre-programmed and therefore not necessarily suitable for every color image. Consequently it may still happen that colors which are satisfactorily distinguishable from one another are printed with the same pattern.

A conversion of color values to gray values in a way which can be controlled by a user is described in U.S. Pat. No. 5,898,819, in which a solution is selected in which an image is divided up into document components, such as text, logos, images and so on. The user can choose a separate solution for each component. Gray scaling can also be selected, and this is equivalent in practice to averaging of the color values. In all these cases, pre-programmed conversion functions are involved, which are not adaptable to the image used. Here again, colors which are satisfactorily distinguishable may be imaged with the same gray value.

SUMMARY OF THE INVENTION

One of the objects of this invention is to improve the conversion of digital color images to gray value images, wherein, in particular, colors which are of themselves distinguishable in the original image are converted to distinguishable gray values.

To this end, the invention provides a method of converting a digital color image to a digital gray value image and in so doing distinguishably reproducing colors present in the color image, the digital color image being built up of pixels each having a color value and the digital gray value image being built up of pixels each having a gray value. In the invention, the color values of the pixels are converted to gray values by the use of a dynamically adapted conversion function which is optimized on the basis of a comparison of color differences in the digital color image and gray value differences corresponding to the color differences in the digital gray value image.

In one embodiment, the conversion function is optimized on the basis of a comparison of gray values in the digital gray value image after conversion with the conversion function and gray values in the digital image valid for the same pixels, after conversion with a pre-defined naïve conversion function.

In the conversion of an original color image to a gray value image, it is important that colors which are satisfactorily distinguishable to a human observer can also be distinguished in the gray value image. This will result in an adaptation of the conversion function in dependence on the color content of the original image and is therefore specific for each color image or group of color images.

Since it is not desirable to depart excessively from the naïve conversion (which roughly corresponds to the luminance sensation of a human observer), the adaptation is also so optimized as to be as close as possible to the naïve conversion.

According to one embodiment of the invention, the optimization is based on color differences between a limited number of color values, hereinafter termed "main colors", which are defined by a cluster analysis of the colors of the color image.

In this embodiment, the color values in the color image are divided into a limited number of groups, termed "clusters", and one color value, termed the "main color", is selected for each cluster, which is the average of the color values in the cluster. Another color value could also be used to represent a cluster, for example the "center of gravity" of the color values in the cluster. An optimization of the conversion function is then carried out just for the set of main colors. This eliminates considerable computing and is nevertheless very effective.

This invention refers to gray values. Gray values can be obtained on a monitor screen by a higher or lower intensity of pixels. In printed matter, the gray values are frequently obtained by half toning. In this, gray areas are filled in by means of dots. The size of the dots then provides a darker or lighter gray tint. The invention is directed to conversion to a gray value image suitable for imaging on a monitor screen for example, but also for printing by means of a digital printing process or a simple printer such as a printer connected to a personal computer.

In one embodiment, the conversion function is a combination of a pre-defined naïve gray value conversion and a localized correction function, which correction function has a value which decreases with the distance in a color space between a color for conversion and a main color. In this way it has been found possible to limit the adaptation to a local area where problems occur. The adapted conversion function is, for example, the sum of the naïve conversion and the correction function.

The invention also is directed to an arrangement for converting a digital color image to a gray value image and a copier and a printer, wherein the method according to the invention is applied. Finally, the invention is directed to computer software for converting a digital color image to a gray value image.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be explained with reference to the following exemplified embodiment(s) of the present invention, and illustrated by reference to drawings. This embodiment serves to illustrate the invention and should not be regarded as a limitation thereof. Referring to the drawings:

FIG. 1A is an example of a color image;

FIG. 1B is a gray value image made by converting the color image of FIG. 1A by a known technique;

FIG. 3A is a projection of the colors of all the pixels of an image onto a plane in the color space perpendicular to the gray value axis;

FIG. 3B shows histograms of the gray values of the different clusters in FIG. 3A;

DETAILED DESCRIPTION OF PREFERRED EMBODIMENTS

In a digital image composed of image dots or pixels, the colors for each pixel are expressed as vectors in a three-dimensional color space. According to a related art, the colors $\vec{c}$ are expressed, for example, in RGB values in a brackets notation as $\vec{c} = (r, g, b)$, or in terms of the base vectors $\hat{r}$, $\hat{g}$, and $\hat{b}$ as:

$$\vec{c} = r\,\hat{r} + g\,\hat{g} + b\,\hat{b} \qquad (1)$$

In a possible naïve gray value conversion of these color values to gray values, $L_0(\vec{c})$, which consists of a weighted linear combination of the values of R, G and B channels, the weighting factors are chosen equally, and this corresponds to averaging of the three channels as follows:

$$L_0(\vec{c}) = \vec{c} \cdot \frac{1}{3}(\hat{r} + \hat{g} + \hat{b}) = \frac{1}{3}(r + g + b) \qquad (2)$$

In these conditions, different combinations of r, g and b can yield the same gray value. A problem occurs when the original image contains totally different colors which yield the same gray value. For example, each of the colors $\vec{c}_1 = \hat{r}$ (red) and $\vec{c}_2 = \hat{g}$ (green) would yield the same gray value $L_0(\vec{c}_1) = L_0(\vec{c}_2) = \frac{1}{3}$ in the gray value image, so that the red and green areas can no longer be distinguished on the basis of their gray values in a color image converted to a gray value image by means of this naïve gray value conversion. This is an obstacle particularly when the areas adjoin one another. This problem is illustrated in FIGS. 1A and 1B, FIG. 1A showing a digital color image and FIG. 1B showing the image converted to gray values. As shown, it is striking that what is a red compartment in a green field in the color image, can no longer be distinguished in the gray value image.

Modified Gray Value Conversion

The invention provides a method of converting a digital color image into a gray value image adapted to the color content of an individual image. One exemplified embodiment of this method is shown diagrammatically in a flow diagram in FIG. 2.

Figure 2:
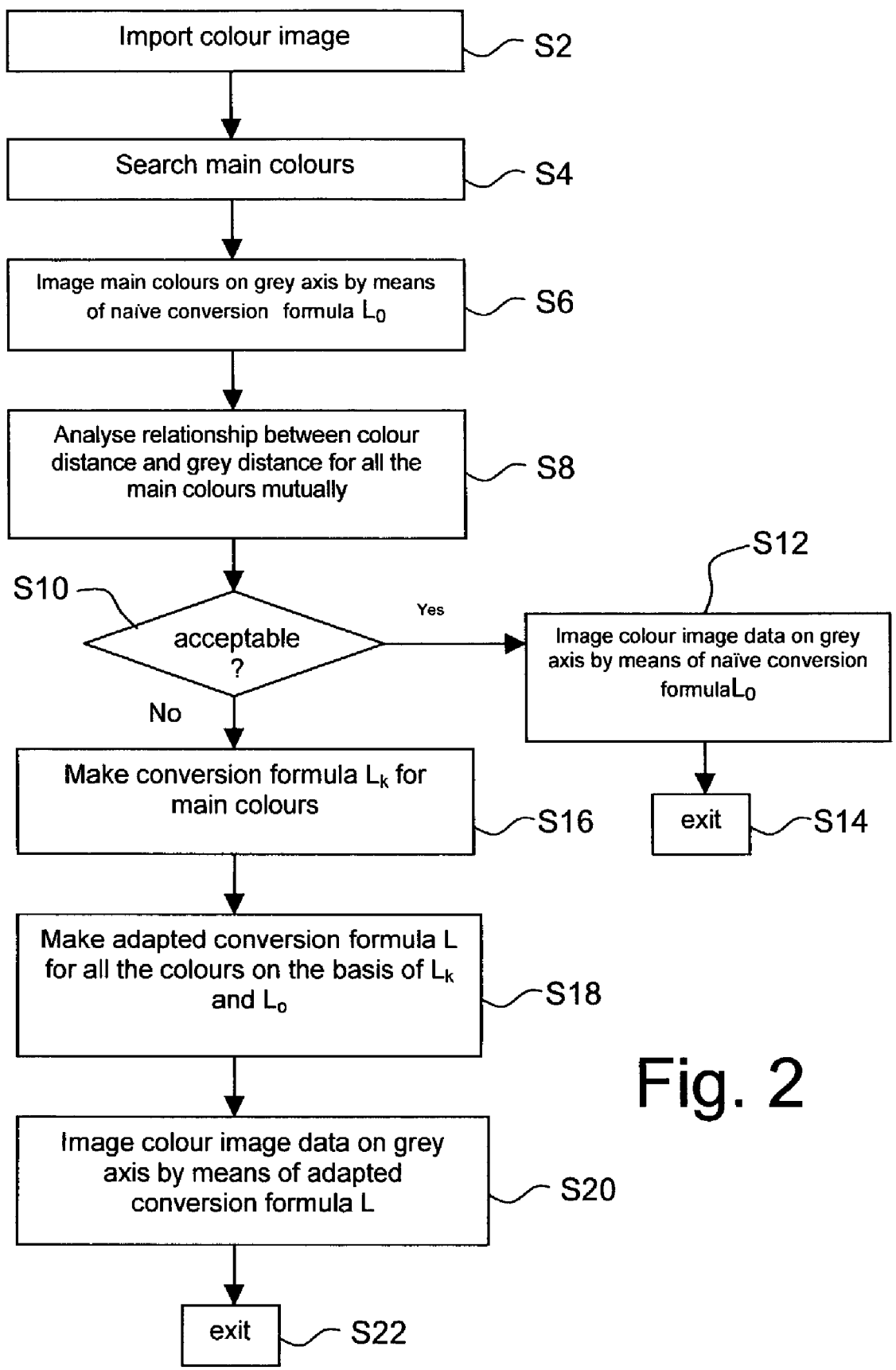
FIG. 2 is a flow diagram for a conversion method according to an embodiment of the invention.

Referring to FIG. 2, a color image is made available for processing in step S2, for example by inputting a file of color image data into a working memory. A color image often contains very many colors and it is not convenient to calculate an adapted conversion for all these colors, because this would require considerable computing power. An analysis is therefore first made of the colors occurring in the color image. In many cases, groups of colors related to varying degrees are found to appear in the color image and have the appearance of a "cloud" in a three-dimensional color space, such as the r, g, b space in this example. A cloud of this kind is hereinafter referred to as a "cluster." In the analysis of this kind, the color space in which the work is being carried out is divided, for example, into a restricted number of sub-spaces each containing a cluster. A representative color value is then selected for each cluster, for example by averaging the colors in the sub-space. These colors are hereinafter referred to as "main colors" (step S4).

One object of this approach is first to calculate an adapted conversion for a restricted number of colors and then extend this adapted conversion to the entire color space. In this way the required computing time can be considerably limited.

Thus the main colors are converted to gray values in the next step S6 by means of a pre-programmed naïve conversion $L_0$, as shown for example in formula (2) above.

For each pair of different main colors, the mutual distance in the color space and the mutual distance of the corresponding gray values on the gray axis of the color space are then calculated in step S8. The results are then compared with a pre-defined limit in order to determine whether adaptation of the conversion function is required (S10). If this does not appear to be necessary (all the color differences appear to correspond to gray value differences of corresponding magnitude), then in step S12 the color image data are converted to gray value image data by means of the naïve conversion function $L_0$, whereafter the processing is complete (step S14).

If it is found in step S10 that distinguishable main color differences have been converted to non-distinguishable gray value differences, then an adapted conversion function $L_k$ is calculated for the main colors in step S16. On the basis of this conversion function $L_k$, an adapted conversion function L is then calculated in step S18 and is valid for all the colors. This is effected by locally adapting the naïve conversion function $L_0$ with a correction factor on the basis of the conversion function $L_k$.

The digital color image is then converted to a digital gray value image by means of the adapted conversion function L in step S20, whereafter the processing is completed (S22).

Steps S8 to S14 can be skipped. They are not essential, but enable the computing time to be reduced, because not every image needs to be processed.

The processing of the present invention will now be described in a more detailed form.

Finding the Main Colors $\vec{c}_k$

The color content of the digital color image (built up of pixels) is analyzed in order to reduce the number of colors occurring to a few representative colors, hereinafter termed "main colors". In this way a simple and compact representation of the color content of the image can be obtained and this simplifies the analysis.

The colors (r, g, b) of all the pixels are projected onto a plane perpendicular to the gray axis, and this is particularly suitable for distinguishing differences in color tone and saturation.

In most cases, the colors of an image appear to be close together in groups (clusters) corresponding to colors recognized by an observer in the image. The main colors are distinguished by identifying different clusters.

The two-dimensional projection plane is defined by two orthogonal unit vectors $\hat{u}$ and $\hat{v}$, and a third orthogonal unit vector $\hat{w}$ in the direction of the gray axis. The projection then consists in effect of a conversion of RGB co-ordinates (r, g, b) to UVW co-ordinates (u, v, w). The (u, v) components then represent the projection on the UV plane. The relevant co-ordinate transformation is defined as follows:

$$\begin{pmatrix} u \\ v \\ w \end{pmatrix} = \begin{pmatrix} -\frac{1}{\sqrt{2}} & \frac{1}{\sqrt{2}} & 0 \\ -\frac{1}{\sqrt{6}} & -\frac{1}{\sqrt{6}} & \frac{2}{\sqrt{6}} \\ \frac{1}{\sqrt{3}} & \frac{1}{\sqrt{3}} & \frac{1}{\sqrt{3}} \end{pmatrix} \cdot \begin{pmatrix} r \\ g \\ b \end{pmatrix} \quad (3)$$

Separate clusters are then identified in the UV plane. A main color is associated with the average, or alternatively, the "center of gravity".

FIG. 3A shows an example of the projection of the colors for a certain image in which eight different clusters can be identified according to the present invention. In FIG. 3B, gray value histograms are given for each of the clusters shown in FIG. 3A. It will be clear that some different cluster colors have the same gray value. Note also that the central cluster in this case consists of two clusters, black and white (FIG. 3B, top row). The boundaries for the clusters are indicated by contours which are drawn around each "cloud" in the UV plane as shown in FIG. 3A. A check is then made whether clusters actually consist of a plurality of clusters in the direction $\hat{w}$ (along the gray axis). In the image in the example, only multiple clusters are observed near (u, v)=(0, 0), where black, white and gray occur.

The color co-ordinates of the different main colors (identified clusters) are expressed as $\vec{c}_k$ in this patent application. Index k refers to an independent main color and lies in the range [1, ..., N], where N is the total number of identified main colors.

Netherlands Patent No. 1013669 describes different alternative methods for automatically searching main colors, and these can also be applied to the present invention.

Analysis of the Naïve Conversion for the Main Colors

When the main colors have been found as discussed above, they are converted to gray values by means of the above-mentioned naïve conversion function $L_0$. A check is then made whether there is an unwanted overlap between the gray values corresponding to the main colors. The latter is the case if the color $\vec{c}_k$ differs considerably for each pair of main colors, but the corresponding gray values $L_0(\vec{c}_k)$ do not or only hardly differ.

In order to quantify the degree of gray value overlap, i.e. the degree of agreement between two colors and their corresponding gray values, based on their mutual distance in the UV plane and their difference along the gray axis, use is made of a penalty function $P_1$.

The difference in "color", $\Delta E_{kl}$, and the difference in gray value, $\Delta L_{kl}$, between two main colors in two different clusters k and l, are represented in this example by:

$$\Delta L_{kl} = (L_k - L_l)^2$$

$$\Delta E_{kl} = (u_k - u_l)^2 + (v_k - v_l)^2 \quad (4)$$

where the original gray value is given by $L_k = L_0(\vec{c}_k)$.

A penalty function $p(\Delta E, \Delta L)$ is so defined that it results in a high value when the color difference $\Delta E$ is large and at the same time the gray value difference $\Delta L$ is small. Any choice of the penalty function $p(\Delta E, \Delta L)$, which meets this basic requirement is possible. For example, the penalty function can be defined in terms of a (scaled) sigmoid hyperbolic tangent function $S(x) = \frac{1}{2}(1 + \tanh x)$, which increases monotonously with x. The penalty function $p(\Delta E, \Delta L)$ is then expressed as:

$$p(\Delta E, \Delta L) = S(-a(\Delta L - b)) \cdot S(c(\Delta E - d)) \quad (5)$$

where the constants a, b, c and d (all>0) quantify the limits of what can be indicated as "large" $\Delta E$, and a "small" $\Delta L$.

The overall penalty function $P_1$ is obtained by summation of equation (5) over all possible cluster pairs as follows:

$$P_1 = \frac{2}{N(N-1)} \sum_{k=1}^{N-1} \sum_{l=k+1}^{N} p(\Delta E_{kl}, \Delta L_{kl}) \quad (6)$$

where N denotes the number of identified clusters.

Note that the summation in equation (6) does not include the identical pairs (k=l), and each pair includes (k, l) in the calculation only once. In this way, a large penalty value for $P_1$ implies that the same main colors $\vec{c}_k$ can be imaged on the same gray value $L_k$ while a low value indicates that the main colors are projected on different gray values.

The value of the penalty function $P_1$ is then compared with a predetermined threshold value. If the value of the penalty function $P_1$ is lower than the threshold value, there is no reason for adapting the conversion and the gray value image from the naïve conversion $L_0$ is used further. In the other case where the value of the penalty function $P_1$ is not lower than the threshold value, the conversion function $L_0$ is so adapted that the main colors are converted to distinguishable gray values. For the adaptation, use is made of the same penalty function $P_1$.

Modification of the Naïve Conversion for the Main Colors

Adaptation of the color-to-gray value conversion is carried out as follows: the gray values corresponding to the main colors are re-positioned on the gray axis, the penalty function is re-calculated and the result is compared with the first value. In an iterative process the best re-positioning of the gray values is thus searched by attempting to obtain a minimal value of the penalty function $P_1$.

Minimization of $P_1$ with respect to the gray values $\{L_k\}$ can be done in various ways, one of which is the gradient descent method. This method repeats the modification of each gray value $L_k$ with small steps proportional to the negative derivative of the penalty function $P_1$ to $L_k$:

$$L'_k = L_k - \alpha \frac{\partial P_1}{\partial L_k} \quad (7)$$

where $L'_k$ is the renewed gray value for each cluster k, and $\alpha$ is a constant factor ($\alpha > 0$).

An even better result can be obtained by regulating the adapting effect of the penalty function $P_1$. Otherwise it would be possible that the new gray values would assume any possible value independently of the original gray value. For example, if the image consists of just two main colors, a minimal penalty function value would be obtained for a maximum separation gray value: black would then be allocated to one main color, while white would be allocated to the other.

To obviate this kind of problem, a second penalty function $P_2$ is introduced. Penalty function $P_2$ increases when the gray value changes more with respect to the gray value from the naïve conversion. As an example, $P_2$ is defined in terms of quadratic differences between new gray values $L_k$ and naïve values $L_0$:

$$P_2 = \sum_{i=1}^{N} (L_k - L_0(\vec{c}_k))^2 \quad (8)$$

A total penalty function P is then defined as the weighted sum of the penalty functions $P_1$ and $P_2$:

$$P = AP_1 + BP_2 \quad (9)$$

where A and B (both positive values) express the relative contribution of the respective penalty functions. In one embodiment, the total penalty function P is minimized in accordance with the following gradient descent rule:

$$L'_k = L_k - \alpha \frac{\partial P_1}{\partial L_k} - \beta \frac{\partial P_2}{\partial L_k} \quad (10)$$

where $\alpha$ and $\beta$ are positive constants. The constants $\alpha$ and $\beta$ can be optimized on the basis of trial and error in order to obtain a satisfactory balance between the adaptation of the gray value and the resemblance to the original image.

Modification of the Naïve Conversion for All the Colors

Based on the new allocated gray values $L_k$ of the respective main colors $\vec{c}_k$, the naïve conversion function $L_0(\vec{c})$ is modified, resulting in a new conversion function $L(\vec{c})$. The new conversion function $L(\vec{c})$ must contain a number of required properties. Firstly, the new conversion function must allocate to a color $\vec{c}$ near a main color k approximately the gray value $L_k$ which was allocated to that main color. Secondly, for a color $\vec{c}$, far away from all the main colors, there is no need to adapt the naïve conversion, so that for these colors $\vec{c}$ the conversion function remains close to the naïve conversion function.

The following conversion function satisfies these conditions. A correction factor which depends on the main colors $\vec{c}_k$ and respective gray values $L_k$ is added to the naïve conversion function $L_0(\vec{c})$ in this:

$$L(\vec{c}) = L_0(\vec{c}) + \frac{\sum_{k=1}^{N} w(\vec{c} - \vec{c}_k)(L_k - L_0(\vec{c}_k))}{w_0 + \sum_{k=1}^{N} w(\vec{c} - \vec{c}_k)} \quad (11)$$

where $w_0$ is a constant weighting factor and $w(\Delta \vec{c})$ is a weighting function which obtains its minimum at $\Delta \vec{c} = 0$, and which decreases with $|\Delta \vec{c}|$.

Different choices are possible for $w(\Delta \vec{c})$. For example, the following can be chosen for the weighting function:

$$w(\Delta \vec{c}) = A \exp\left(-\frac{\Delta \vec{c}^2}{2\sigma^2}\right) \quad (12)$$

where A is the maximum amplitude of $w(\Delta c)$ and the constant $\sigma$ indicates the size of the area around the cluster centre $\vec{c}_k$ in which the weighting function $w(\vec{c} - \vec{c}_k)$ is large with respect to $w_0$.

The fact that the modified conversion function $L(\vec{c})$ in formula (11) above satisfies the required properties will now be explained.

Where $\vec{c}$ is situated near cluster centre $\vec{c}_j$, $\vec{c} \approx \vec{c}_j$ and as a result $w(\vec{c} - \vec{c}_j)$ is large with respect to $w_0$. Assuming that the clusters are distinctly separated, the other weights will be small, say $w(|\vec{c} - \vec{c}_k|) \approx 0$, for $k \neq j$. The conversion function $L(\vec{c})$ can therefore be approximated by $L(\vec{c}) \approx L_0(\vec{c}) - L_0(\vec{c}_j) + L_j \approx L_j$, and this satisfies the first required property of the new conversion function mentioned above.

If $\vec{c}$ is far away from all the cluster centres $\vec{c}_k$, $|\vec{c} - \vec{c}_k|$ will be large and hence $w(\vec{c} - \vec{c}_k)$ will be small with respect to $w_0$ for all k. The correction factor in equation (11) above will then be small so that $L(\vec{c}) \approx L_0(\vec{c})$ and this satisfies the second required property of the new conversion function mentioned above.

Figure 4:
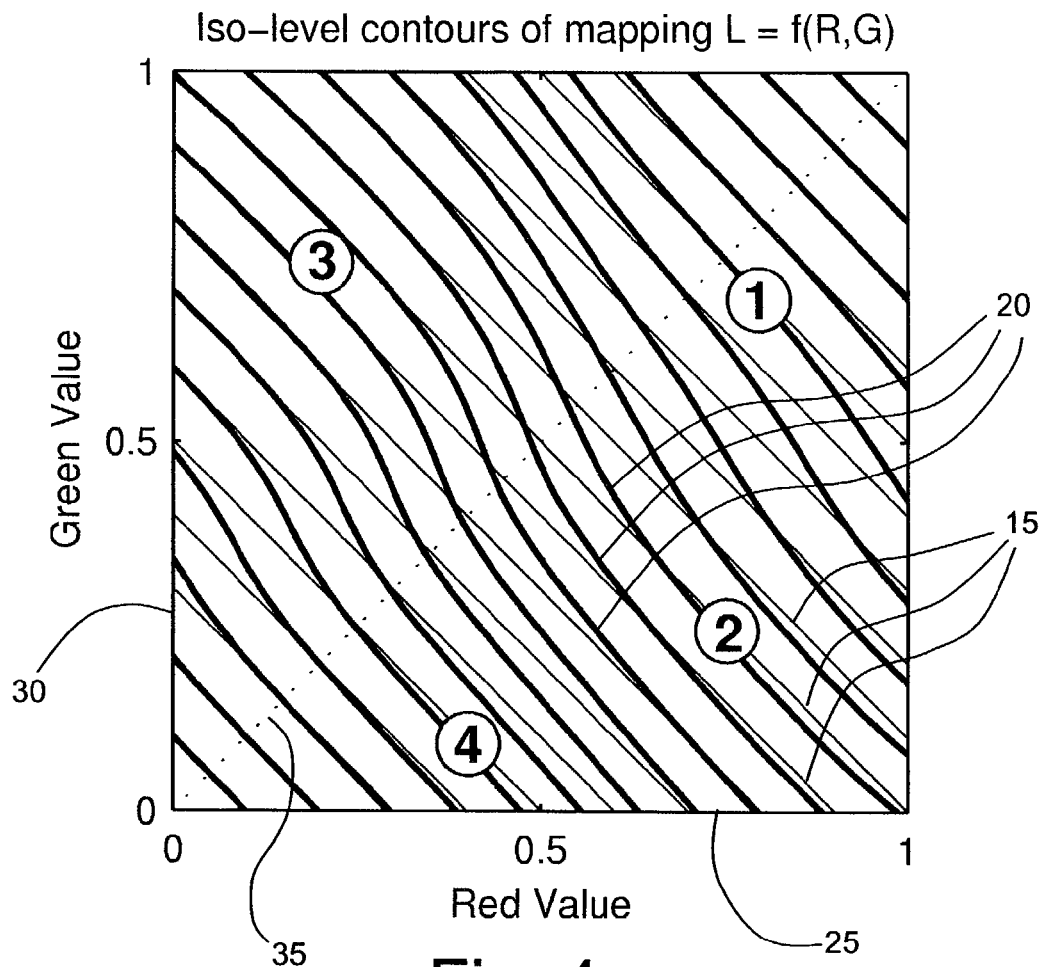
FIG. 4 is an iso-gray contour of a gray value adaptation according to an embodiment of the invention.

To give an idea of how a modified conversion function behaves in a color space, FIG. 4 shows iso-gray lines of a naïve conversion function $L_0(\vec{c})$ (15) and of an adapted conversion function $L(\vec{c})$ (20) for an example.

FIG. 4 shows a two-dimensional color space extending through a horizontal red axis 25 and a vertical green axis 30. The blue channel is disregarded, so that the conversion function can be visualized in a two-dimensional graph. The gray axis 35 extends diagonally between the red and green axes 25 and 30.

Referring to FIG. 4, four color clusters ①-④ are shown in different positions in the RG (red and green axes) plane. A problem now occurs in the case of colors ② and ③, since their large distance in the RG plane is not expressed in the difference in the corresponding gray values according to the naïve color-to-gray conversion: both colors have practically the same gray value (thin lines 15). The adapted conversion function of the present invention has been modified in the case of these two colors particularly and gives a higher gray value to color ② and a lower gray value to color ③ (lines 20). As a result, the color values of both the clusters ② and ③ are clearly distinguished in the new conversion function.

The constants introduced into the foregoing description can be filled in by the skilled person in the art on a trial and error basis. Good results are obtained with the following values. However, these examples are given solely as an example only.

formula (5): $\quad a = 6$
$\quad b = 0.25$
$\quad c = 6$
$\quad d = 0.75$ formula (10): $\quad \alpha = 0.005$
$\quad \beta = 0.0005$ formula (11): $\quad w_0 = 1$ formula (12): $\quad A = 50$
$\quad \sigma = 0.15$ Practical Application of the Invention FIG. 5 shows a diagrammatic representation of parts of a digital photocopier to which the invention as described above is applied.

Figure 5:
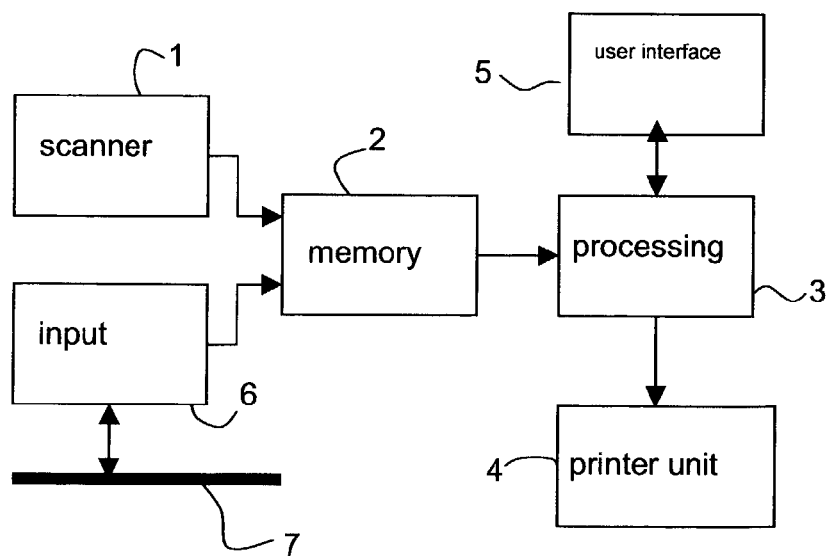
FIG. 5 is a block diagram of a digital copier usable in the present invention.

Referring to FIG. 5, this machine is provided with a scanner 1 having a device for converting a recorded image to a digital image, a memory 2 for storing the digital image, a processing unit 3 for processing the digital image and a printing unit 4 for printing the processed digital image on paper or any suitable medium. A print of this kind may be a color print. In most cases, a black and white print is made, or a gray value print is made. Many printing units cannot print actual gray values, but can simulate gray values with raster techniques such as dithering or error diffusion.

The machine is also provided with an operator interface 5 and an input unit 6 for receiving digital images made elsewhere, e.g., via a network 7, so that the machine can also be used as a printer. All the components of the machine are operatively coupled.

The input image originating from the scanner 1 or the input unit 6 may be a color image. To make a gray value print, this color image must be converted to a gray value image. To this end, the processing unit 3 is provided with a module for converting a color image to a gray value image according to the invention.

The processing unit 3 is connected to the operating unit ("user interface") 5. The user interface 5 comprises selection means for switching on or off the conversion adaptation according to the invention, and may possibly also be provided with setting means for manually setting the setting parameters of the conversion function, for example by means of a slide or button. Also, the user interface 5 may be provided with reproducing means, for example a monitor, by means of which the user can interactively assess the result of the automatic or manual adaptations. On the other hand it is possible to arrange for any optimization to be carried out completely automatically without the intervention of the user, or alternatively just to give the user the possibility of switching the optimization of the conversion on or off.

When the invention is used in the printer (for example, an independent network printer or the above-described digital copier, working as a printer), the user can, for example, indicate by means of the printer driver at his workstation that a color image must be printed in gray values. In that case, a processing device in the printer will convert the digital color image to a gray value image and print the latter.

It is also possible to carry out the color-to-gray conversion in a separate computer, for example the workstation of a user, and then send the converted digital image to a printer or store it in a mass memory.

Although the invention has been explained by reference to the above-described exemplified embodiment, it is not limited thereto. It will be clear to the skilled person that other embodiments are possible within the scope of the claims.

The invention claimed is:

1. A method for converting a digital color image to a digital gray value image so as to distinguish colors present in the color image, the digital color image being built up of pixels each having a color value and the digital gray value image being built up of pixels each having a gray value, the method comprising:
converting the color values of the pixels to gray values by using a dynamically adapted conversion function which is generated on the basis of a comparison of color differences between a plurality of main color values of main colors in the digital color image and gray value differences corresponding to said color differences in the digital gray value image, said main color values being defined by a cluster analysis of the colors of the digital color image,
wherein the adapted conversion function is a combination of a pre-defined naïve gray value conversion and a localized correction function, wherein the localized correction function has a value which decreases with a distance in a color space between a color for conversion and a corresponding main color; and
printing, by a printing device, the converted gray values.

2. The method according to claim 1, wherein an optimization is carried out automatically, for each color image for conversion or for each group of color images for conversion separately.

3. The method according to claim 1, wherein said adapted conversion function is also optimized on the basis of a comparison of gray values in the digital gray value image after conversion with said conversion function and gray values valid for the same pixels in the digital gray value image after conversion with a predefined naïve conversion function.

4. A method for converting a digital color image, built up of pixels, to a gray value image so as to distinguish colors present in the color image, the method comprising:
- (a) determining main color values of the digital color image by using a cluster analysis of the colors of the pixels in a color space;
- (b) converting said main color values to gray values by using a predefined naïve conversion function;
- (c) calculating a distance in a color space between the main color values to produce a color distance;
- (d) calculating a distance on a gray value scale between gray values corresponding to the main color values to produce a gray distance;
- (e) compiling an adapted conversion function for optimization of an agreement between corresponding gray distances and color distances;
- (f) converting color values of the pixels of the digital color image to gray values using the adapted conversion function; and
- (g) printing, by a printing device, the converted gray values obtained in the step (f).

5. The method according to claim 4, wherein the step (e) comprises calculating a localized correction function by using the optimization of the agreement between the corresponding gray distances and color distances for said main colors, and combining the naïve conversion function and the localized correction function as the adapted conversion function.

6. A computer-readable medium encoded with a computer program for converting a digital color image to a digital color image to a digital gray value image so as to distinguish colors present in the color image, the digital color image being built up of pixels each having a color value and the digital gray value image built up of pixels each having a gray value, the computer program comprising computer-readable instruction for:
converting the color values of the pixel to gray values by using a dynamically adapted conversion function which is generated on the basis of comparison of color differences in the digital color image and gray value differences between a plurality of main color values of main color corresponding to said color differences in the digital gray value image, said main color value being defined by a cluster analysis of the colors of the digital color image,
wherein the adapted conversion function is a combination of a pre-defined naïve gray value conversion and a localized correction function, wherein the localized correction function has a value which decreases with a distance in a color space between a color for conversion and a corresponding main color.

7. The computer-readable medium according to claim 6, wherein an optimization is carried out automatically.

8. The computer-readable medium according to claim 6, wherein said conversion function is also optimized on the basis of a comparison of gray values in the digital gray value image after conversion with said conversion function and gray values valid for the same pixels in the digital gray value image after conversion with a predefined naïve conversion function.

9. A printing device provided with an input unit, a processing unit for processing digital input image data, and a printing unit, wherein the processing unit includes a conversion apparatus comprising:
a cluster module to determine main color values of a digital color image by using a cluster analysis of the colors of the pixels in a color space;
a conversion module to convert the main color values to gray values by using a conversion function;
a color distance module to calculate the color distance between the main color values in a color space;
a gray distance module to calculate the gray distance between gray values on a gray value scale; and
an adaptation module to compile an adaptive conversion function for optimization of an agreement between corresponding gray distances and color distances.

10. The printing device according to claim 9, wherein the input unit comprises a scanner.

11. The printing device according to claim 10, further comprising:
a user interface provided with means for switching said conversion apparatus so that the color-to-gray value conversion is performed optionally by a pre-defined naïve conversion function or by an automatically adapted conversion function.

12. The printing device according to claim 10, wherein the adapted conversion function is a combination of a pre-defined naïve gray value conversion and a localized correction function, wherein the localized correction function has a value which decreases with a distance in a color space between a color for conversion and a corresponding main color.

13. The printing device according to claim 9, wherein the input unit comprises a network connection unit for receiving externally generated print orders.

14. The printing device according to claim 13, wherein said conversion apparatus is programmable so that a color-to-gray value conversion is performed optionally by using a pre-defined naïve conversion function or by using an automatically adapted conversion function.

15. The printing device according to claim 13, wherein the adapted conversion function is a combination of a pre-defined naïve gray value conversion and a localized correction function, wherein the localized correction function has a value which decreases with a distance in a color space between a color for conversion and a corresponding main color.

* * * * *